US00RE50450E

(19) United States
(12) Reissued Patent
Kruse et al.

(10) Patent Number: US RE50,450 E
(45) Date of Reissued Patent: Jun. 10, 2025

(54) COMBINATION OF UPRIGHT AND HANDRAIL SUPPORTS

(71) Applicant: Peloton Interactive, Inc, New York, NY (US)

(72) Inventors: Mark Kruse, Brooklyn, NY (US); Jason Poure, Hastings on Hudson, NY (US); Nigel John Alcorn, Brooklyn, NY (US); Lee Hendrickson, Brooklyn, NY (US)

(73) Assignee: Peloton Interactive, Inc., New York, NY (US)

(21) Appl. No.: 29/932,946

(22) Filed: Mar. 15, 2024

Related U.S. Patent Documents

Reissue of:

(64) Patent No.: Des. 946,097
Issued: Mar. 15, 2022
Appl. No.: 29/758,470
Filed: Nov. 16, 2020

U.S. Applications:

(62) Division of application No. 29/724,262, filed on Feb. 13, 2020, now Pat. No. Des. 902,332, which is a division of application No. 29/692,629, filed on May 28, 2019, now Pat. No. Des. 875,856, which is a division of application No. 29/632,278, filed on Jan. 5, 2018, now Pat. No. Des. 854,101, application No. 29/932,946, filed on Mar. 15, 2024 is a division of application No. 29/932,940, filed on Mar. 15, 2024, which is an application for the reissue of Pat. No. Des. 946,097.

(51) LOC (15) Cl. ..... 21-02

(52) U.S. Cl.
USPC ..... D21/694; D21/669

(58) Field of Classification Search
USPC ..... D21/662, 668, 669, 670, 671, 694, 800; D8/107, 300, 301, 307, 310, 311, 312; D23/250, 421
CPC . A63B 21/023; A63B 21/225; A63B 21/4035; A63B 22/02; A63B 22/025; A63B 22/0046
See application file for complete search history.

(56) References Cited

U.S. PATENT DOCUMENTS

| | | | | |
|---|---|---|---|---|
| 3,642,279 | A | 2/1972 | Cutter | |
| 5,018,722 | A | 5/1991 | Whitmore | |
| D333,887 | S | 3/1993 | Dowler | |
| 5,411,279 | A | 5/1995 | Magid | |
| 5,470,293 | A | 11/1995 | Schonenberger | |
| 5,527,241 | A | 6/1996 | Peng | |
| 5,538,489 | A | 7/1996 | Magid | |
| D374,260 | S | 10/1996 | Snyderman et al. | |
| 5,577,598 | A | 11/1996 | Schoenenberger | |
| 5,709,632 | A | 1/1998 | Socwell | |
| 5,897,461 | A | 4/1999 | Socwell | |
| D416,060 | S * | 11/1999 | Angeles | D8/312 |
| 6,042,514 | A | 3/2000 | Abelbeck | |
| 6,053,848 | A | 4/2000 | Eschenbach | |
| 6,095,952 | A | 8/2000 | Ali et al. | |
| 6,123,647 | A | 9/2000 | Mitchell | |
| 6,146,315 | A | 11/2000 | Schonenberger | |
| 6,180,210 | B1 | 1/2001 | Debus | |
| D445,152 | S | 7/2001 | Wang et al. | |
| 6,348,025 | B1 | 2/2002 | Schonenberger | |
| D461,876 | S * | 8/2002 | Green | D23/250 |
| D472,947 | S * | 4/2003 | Wu | D8/312 |
| D484,554 | S | 12/2003 | Hellman, Jr. et al. | |
| D492,559 | S * | 7/2004 | Itano | D8/51 |
| 6,918,859 | B1 | 7/2005 | Yeh | |
| D579,992 | S | 11/2008 | Cesaroni | |
| D590,232 | S * | 4/2009 | Demers | D8/107 |
| D600,094 | S * | 9/2009 | Hwang | D8/312 |
| 7,976,437 | B1 | 7/2011 | von Detten | |
| 8,308,619 | B1 | 11/2012 | Astilean | |
| D673,020 | S * | 12/2012 | Brummitt | D8/14.1 |
| 8,343,016 | B1 | 1/2013 | Astilean | |
| D676,551 | S * | 2/2013 | Desai | D24/129 |
| D707,763 | S | 6/2014 | Cutler | |
| D709,147 | S | 7/2014 | Oransky | |
| 8,920,347 | B2 | 12/2014 | Bayerlein et al. | |
| 9,039,579 | B1 | 5/2015 | Osime | |
| 9,044,637 | B2 | 6/2015 | Karl | |
| D751,156 | S | 3/2016 | Tasca et al. | |
| D755,029 | S * | 5/2016 | Myers | D8/312 |
| D763,976 | S | 8/2016 | Vezeau et al. | |
| 9,694,234 | B2 | 7/2017 | Dalebout et al. | |
| 10,010,748 | B1 | 7/2018 | Weinstein et al. | |
| D827,058 | S | 8/2018 | Lisi et al. | |

NEW

| | | | | |
|---|---|---|---|---|
| D827,733 | S | 9/2018 | Hochstrasser | |
| 10,265,566 | B2 | 4/2019 | Bayerlein et al. | |
| D849,501 | S * | 5/2019 | Wilson, II | D8/312 |
| 10,299,988 | B2 | 5/2019 | Shin | |
| D854,101 | S | 7/2019 | Kruse et al. | |
| D859,543 | S | 9/2019 | Lisi et al. | |
| D873,934 | S | 1/2020 | Mino | |
| D875,856 | S | 2/2020 | Kruse et al. | |
| 10,556,168 | B2 | 2/2020 | Fima | |
| 10,625,137 | B2 | 4/2020 | Dalebout et al. | |
| 10,632,339 | B2 | 4/2020 | Chen | |
| D888,715 | S * | 6/2020 | Hendrickson | D14/432 |
| 10,668,321 | B2 | 6/2020 | Yoo | |
| 10,695,613 | B2 * | 6/2020 | Chang | A63B 21/225 |
| D890,594 | S * | 7/2020 | Gao | D8/312 |
| D902,332 | S * | 11/2020 | Kruse | D21/669 |
| D934,352 | S * | 10/2021 | Li | D21/669 |
| 2005/0170935 | A1 | 8/2005 | Manser | |
| 2005/0255970 | A1 * | 11/2005 | Wu | A63B 22/0228 482/54 |
| 2006/0160665 | A1 | 7/2006 | Tai | |
| 2007/0072743 | A1 | 3/2007 | Severino et al. | |
| 2007/0298937 | A1 | 12/2007 | Shah et al. | |
| 2008/0176719 | A1 | 7/2008 | To | |
| 2009/0215589 | A1 | 8/2009 | Schoenenberger | |
| 2010/0285929 | A1 | 11/2010 | Bayerlein et al. | |
| 2011/0152038 | A1 | 6/2011 | Freitag | |
| 2011/0266091 | A1 | 11/2011 | Taylor | |
| 2012/0157267 | A1 | 6/2012 | Lo | |
| 2012/0231934 | A1 | 9/2012 | Lo | |
| 2012/0270705 | A1 | 10/2012 | Lo | |
| 2014/0011642 | A1 | 1/2014 | Astilean | |
| 2014/0336010 | A1 | 11/2014 | Burger | |
| 2016/0023039 | A1 | 1/2016 | Cei | |
| 2016/0096064 | A1 | 4/2016 | Gatti | |
| 2016/0144225 | A1 | 5/2016 | Dalebout et al. | |
| 2016/0166877 | A1 | 6/2016 | Cei et al. | |
| 2016/0279465 | A1 | 9/2016 | Chang | |
| 2016/0367851 | A1 | 12/2016 | Astilean et al. | |
| 2017/0113093 | A1 | 4/2017 | Bellavista et al. | |
| 2017/0312566 | A1 | 11/2017 | Chang | |
| 2017/0312582 | A1 | 11/2017 | Root, Jr. | |
| 2018/0001134 | A1 | 1/2018 | Bayerlein et al. | |
| 2018/0056132 | A1 | 3/2018 | Foley et al. | |
| 2018/0104534 | A1 | 4/2018 | Erkelenz et al. | |
| 2018/0111018 | A1 | 4/2018 | Lee | |
| 2018/0126249 | A1 | 5/2018 | Consiglio et al. | |
| 2018/0140896 | A1 | 5/2018 | Chen | |
| 2018/0140903 | A1 | 5/2018 | Poure et al. | |
| 2018/0264315 | A1 | 9/2018 | Chen | |
| 2019/0060705 | A1 | 2/2019 | Yoo | |
| 2019/0118030 | A1 | 4/2019 | Yoo | |
| 2019/0126093 | A1 | 5/2019 | Yoo | |
| 2019/0168066 | A1 | 6/2019 | Yoo et al. | |
| 2019/0168067 | A1 | 6/2019 | Bates et al. | |
| 2019/0192952 | A1 | 6/2019 | Powell | |
| 2019/0217182 | A1 | 7/2019 | Kueker et al. | |
| 2019/0255382 | A1 | 8/2019 | Rudelstorfer | |
| 2019/0290956 | A1 | 9/2019 | Ren | |
| 2020/0094105 | A1 | 3/2020 | Kueker | |

FOREIGN PATENT DOCUMENTS

| | | | |
|---|---|---|---|
| WO | WO2010107632 | A1 | 9/2010 |
| WO | WO2010107840 | A1 | 9/2010 |
| WO | WO2014160057 | A2 | 10/2014 |

OTHER PUBLICATIONS

Sydney Kaiser. "Peloton Tread+ Treadmill Review—Pros & Cons (2024)." Treadmill Review Guru., Apr. 12, 2024 [online], [retrieved on Jun. 24, 2024]. Retrieved from the Internet <URL: https://www.treadmillreviewguru.com/peloton-tread-plus-review/>.*

"Designing Fitness Technology: An Interview with Peloton." Engineering.com., Nov. 10, 2021 [online], [retrieved on Jun. 24, 2024]. Retrieved from the Internet <URL: https://www.engineering.com/designing-fitness-technology-an-interview-with-peloton/>.*

* cited by examiner

*Primary Examiner* — Darlington Ly
(74) *Attorney, Agent, or Firm* — Haynes and Boone, LLP

(57) CLAIM

The ornamental design for a [set of control knobs] *combination of upright and handrail supports*, as shown and described.

DESCRIPTION

[FIG. 1 is a front perspective view of a set of control knobs in which environment comprising a treadmill is disclaimed;]
[FIG. 2 is a back perspective view thereof;]
[FIG. 3 is a front view thereof;]
[FIG. 4 is a back view thereof;]
[FIG. 5 is a left-side view thereof;]
[FIG. 6 is a right-side view thereof;]
[FIG. 7 is a top view thereof;]
[FIG. 8 is a bottom view thereof;]
[FIG. 9 is an enlarged front perspective view of one of the control knobs with the disclaimed environment removed for clarity of disclosure. The claimed design includes the mirror image of the control knob depicted that is not shown;]
[FIG. 10 is an enlarged back perspective view thereof;]
[FIG. 11 is an enlarged top view thereof;]
[FIG. 12 is an enlarged bottom view thereof;]
[FIG. 13 is an enlarged left-side view thereof. The expanded right-side view is identical to the expanded left-side view; and,]
[FIG. 14 is an enlarged front view thereof.]
*FIG. 1 is a front perspective view of a combination of portions of upright supports and handrail supports of a treadmill;*
*FIG. 2 is a back perspective view thereof;*
*FIG. 3 is a front view thereof;*
*FIG. 4 is a back view thereof;*
*FIG. 5 is a left-side view thereof;*
*FIG. 6 is a right-side view thereof;*
*FIG. 7 is a top view thereof; and,*
*FIG. 8 is a bottom view thereof.*
The broken lines [depicts portions of the treadmill or portion thereof and/or environment of the treadmill or portions thereof which] *in the drawings illustrate portions of the combination of upright and handrail supports and an environmental treadmill that form no part of the claim design.*

1 Claim, 22 Drawing Sheets

Matter enclosed in heavy brackets [ ] appears in the original patent but forms no part of this reissue; matter printed in italics indicates the additions made by reissue.

CANCELED

CANCELED

CANCELED

CANCELED

CANCELED

CANCELED

CANCELED

CANCELED

CANCELED

CANCELED

CANCELED

CANCELED

CANCELED

CANCELED

Figure 1:
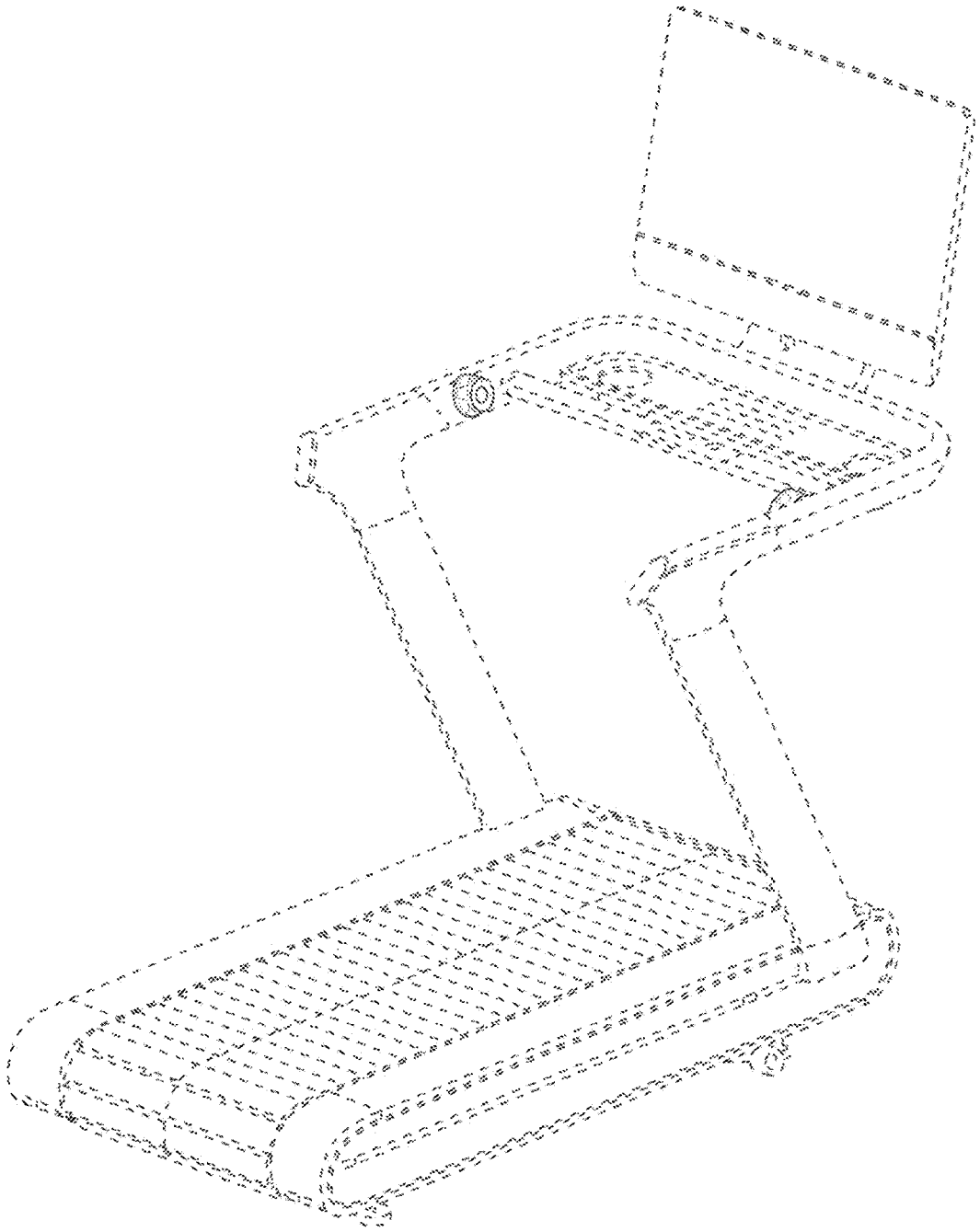

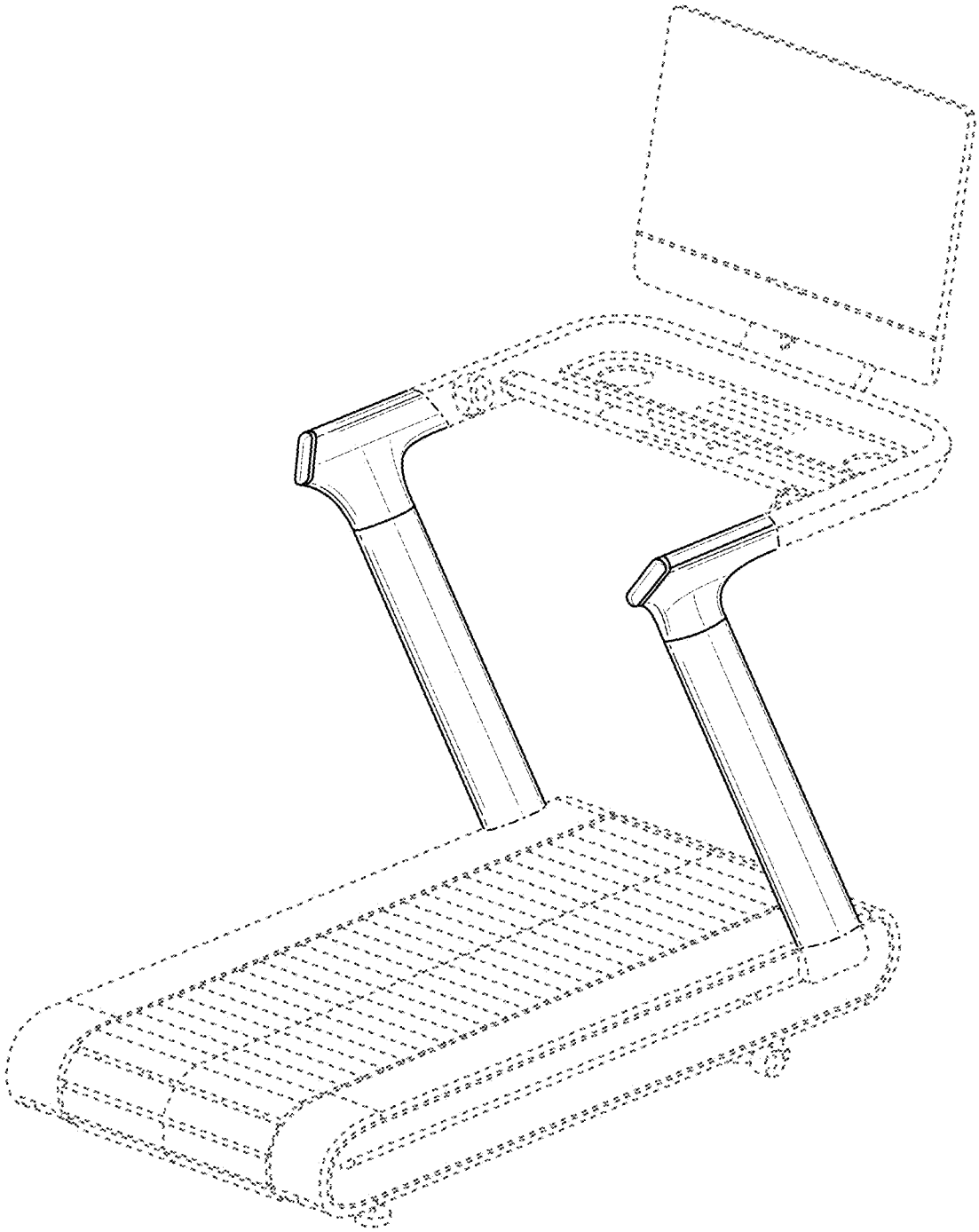
FIG. 1
NEW

Figure 2:
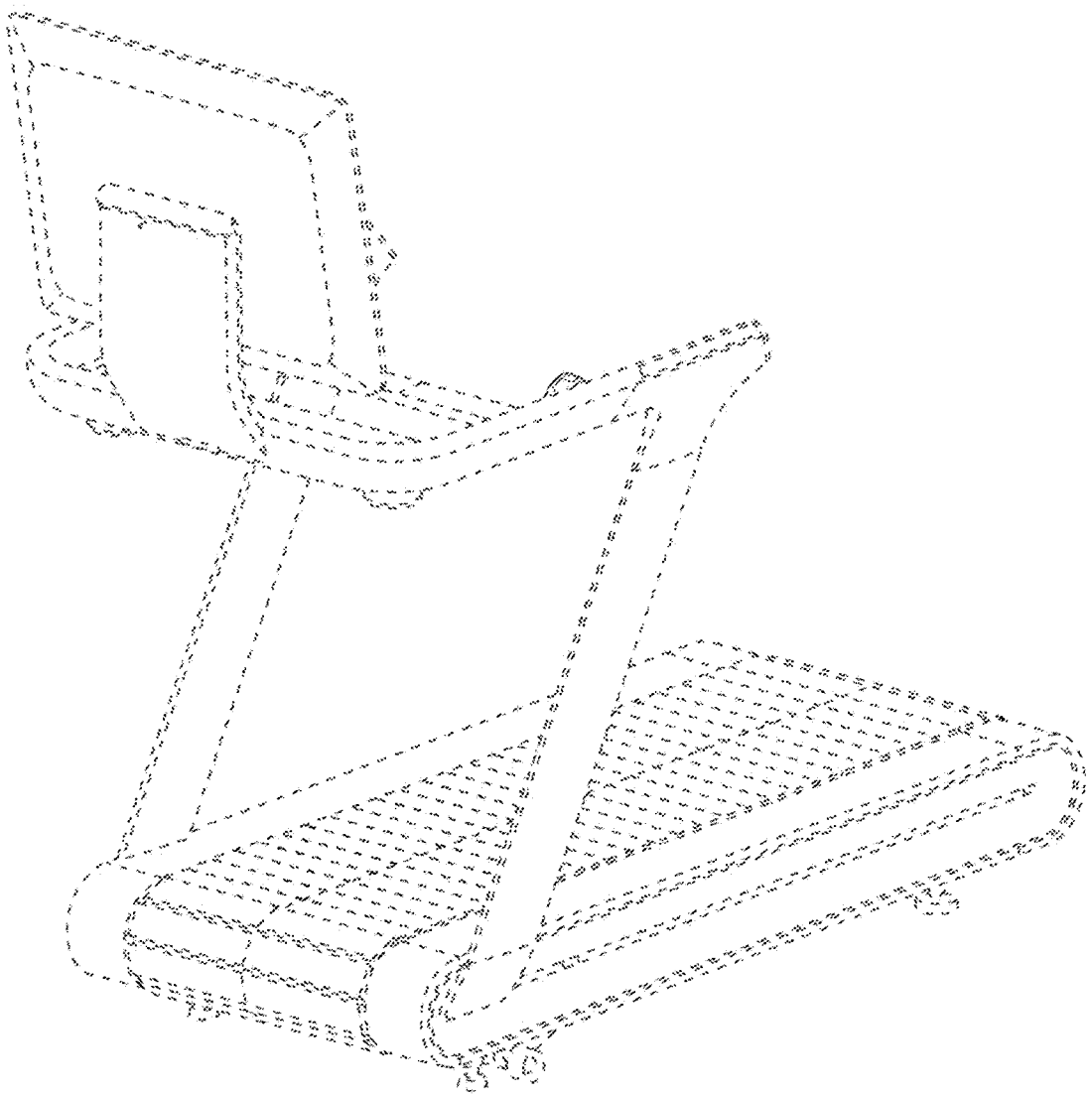

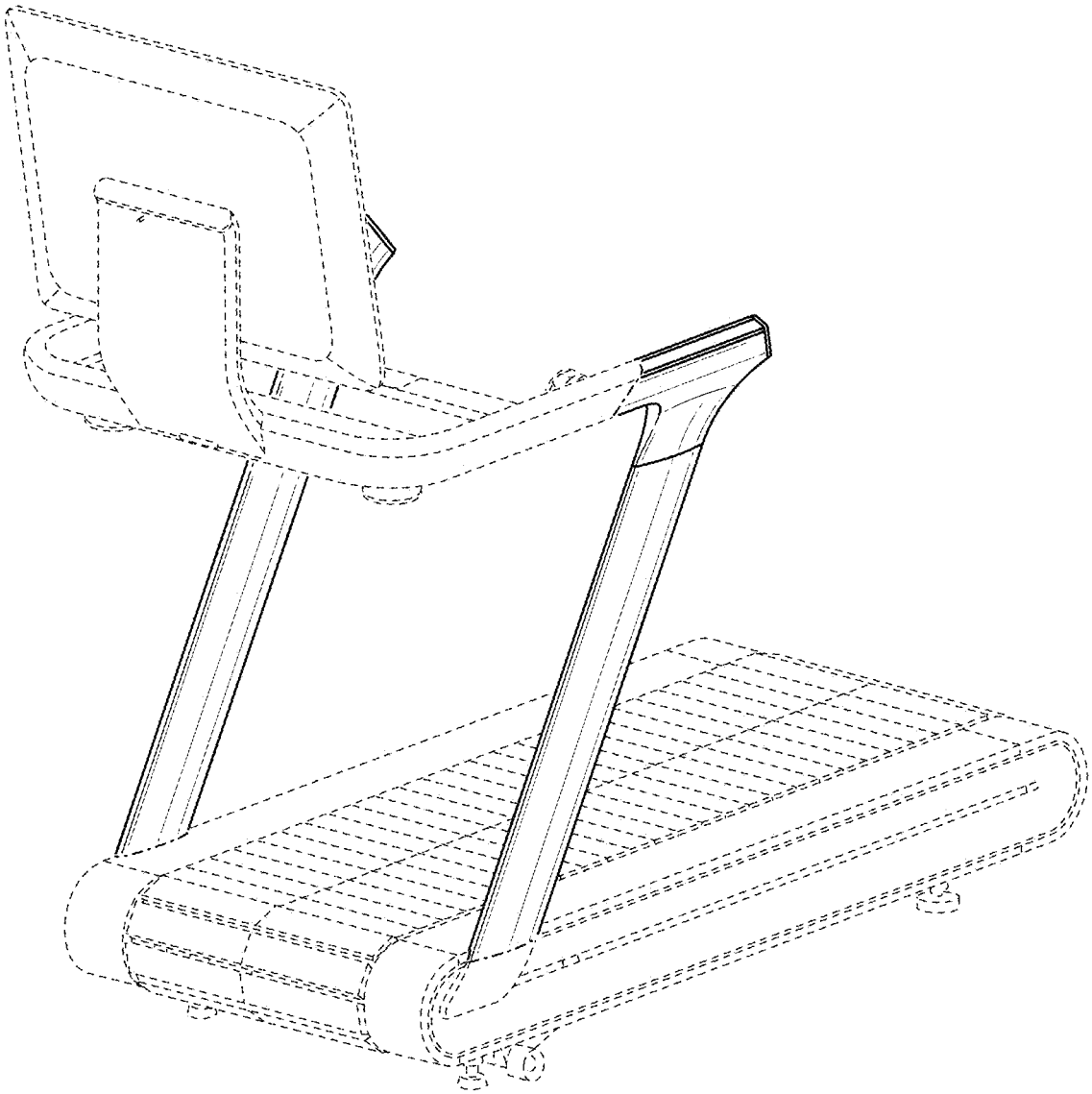
FIG. 2
NEW

Figure 3:
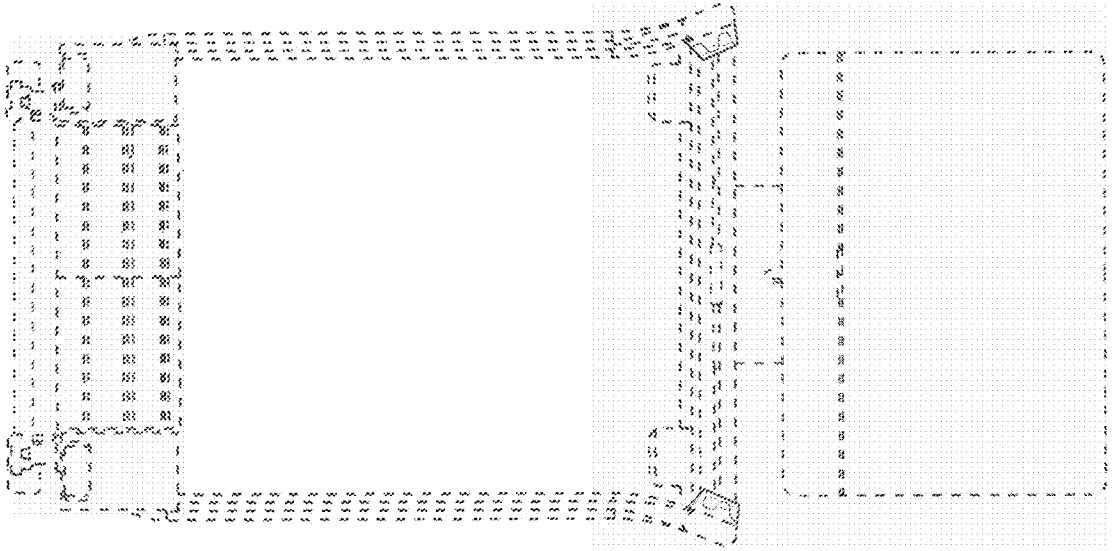

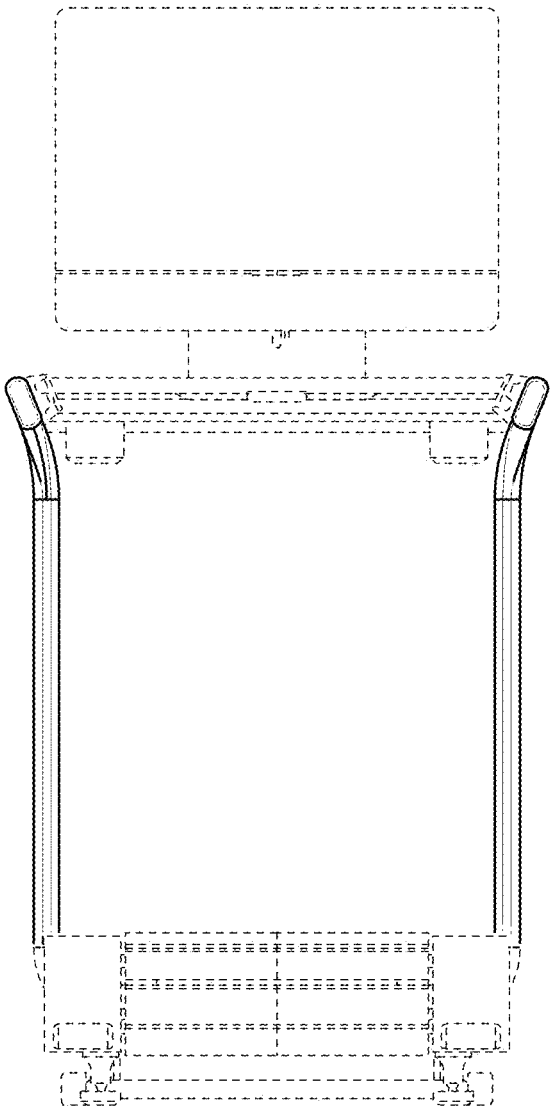
FIG. 3
NEW

Figure 4:
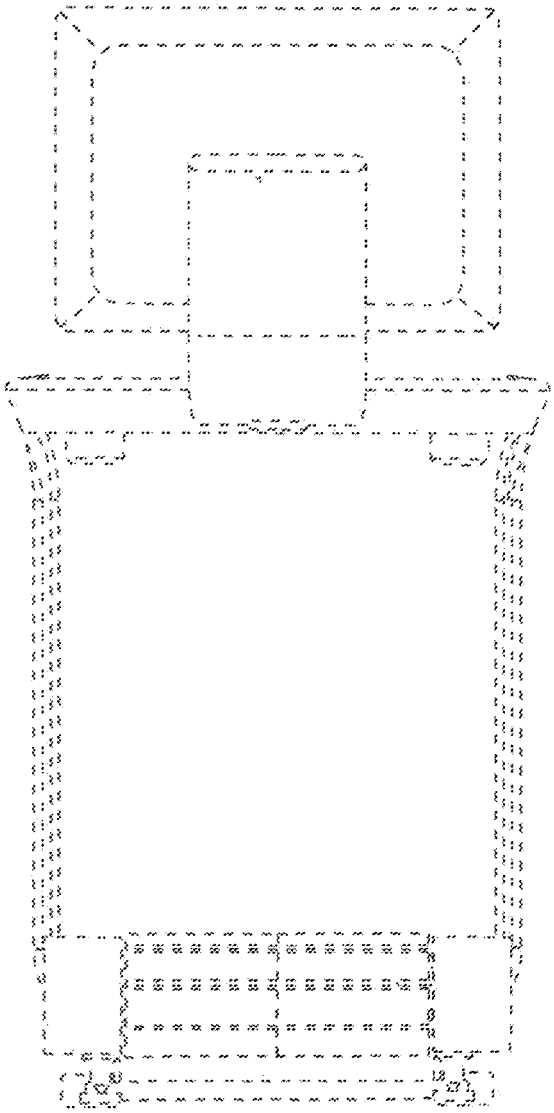

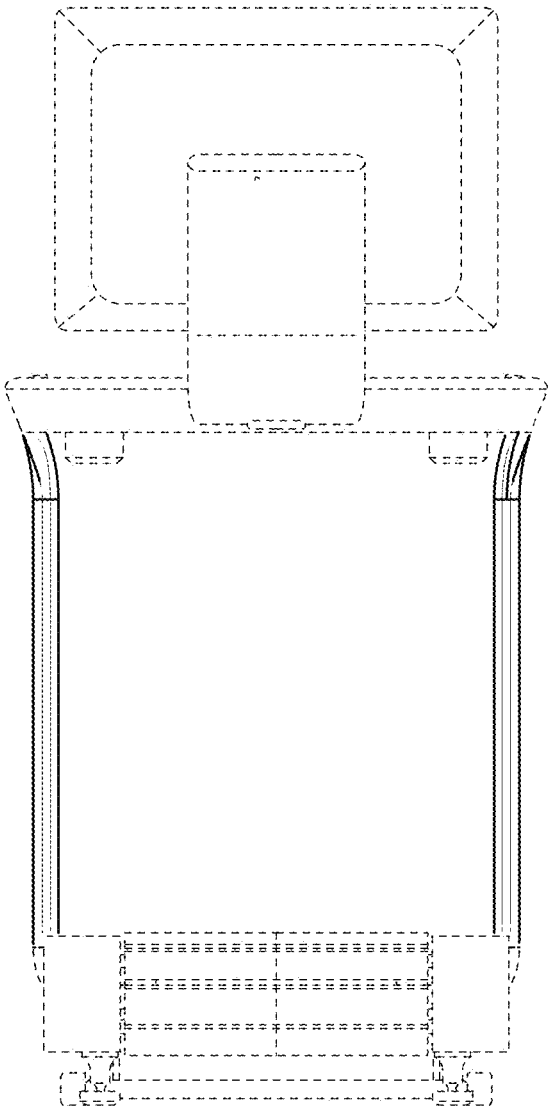
FIG. 4
NEW

Figure 5:
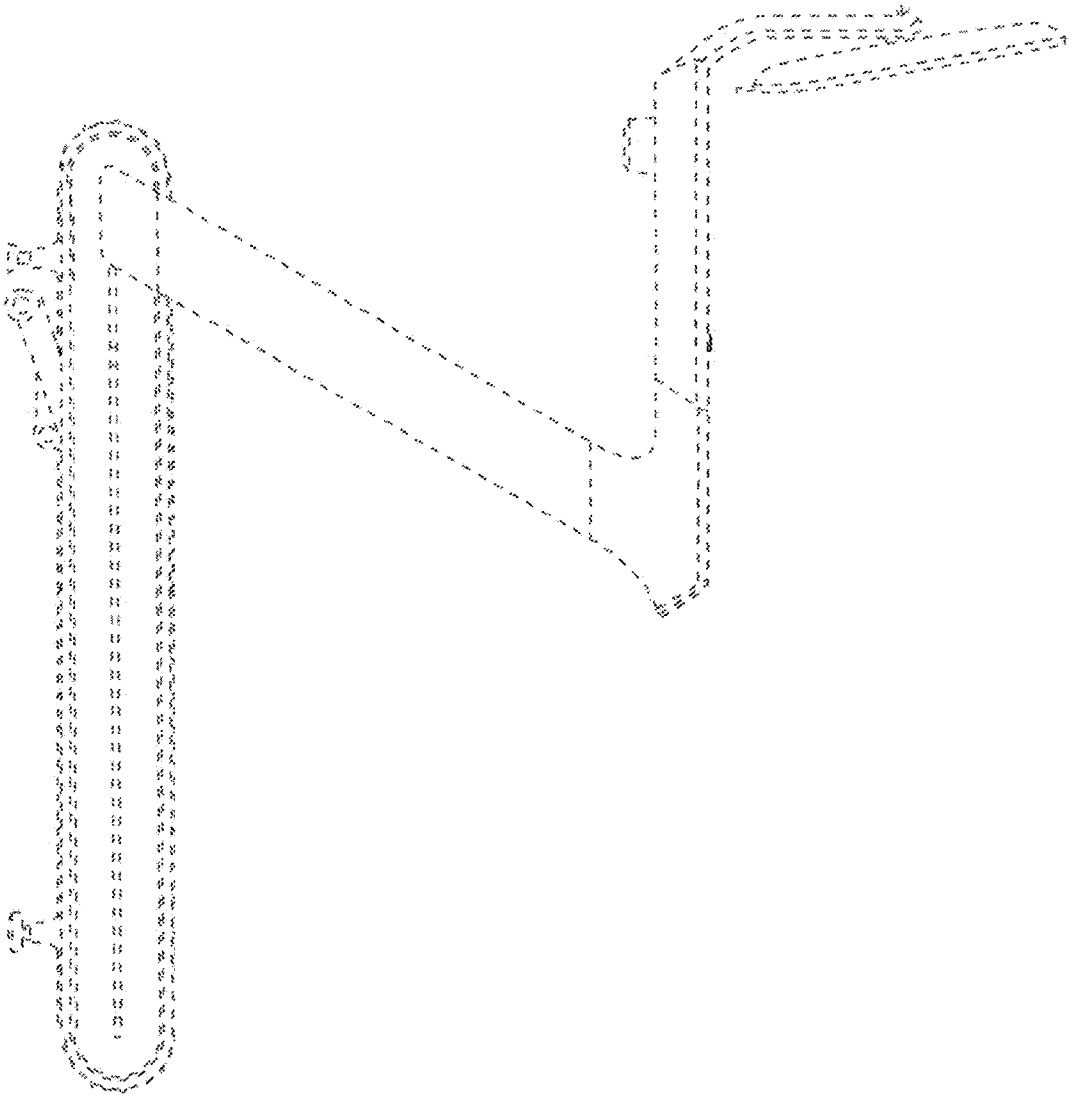

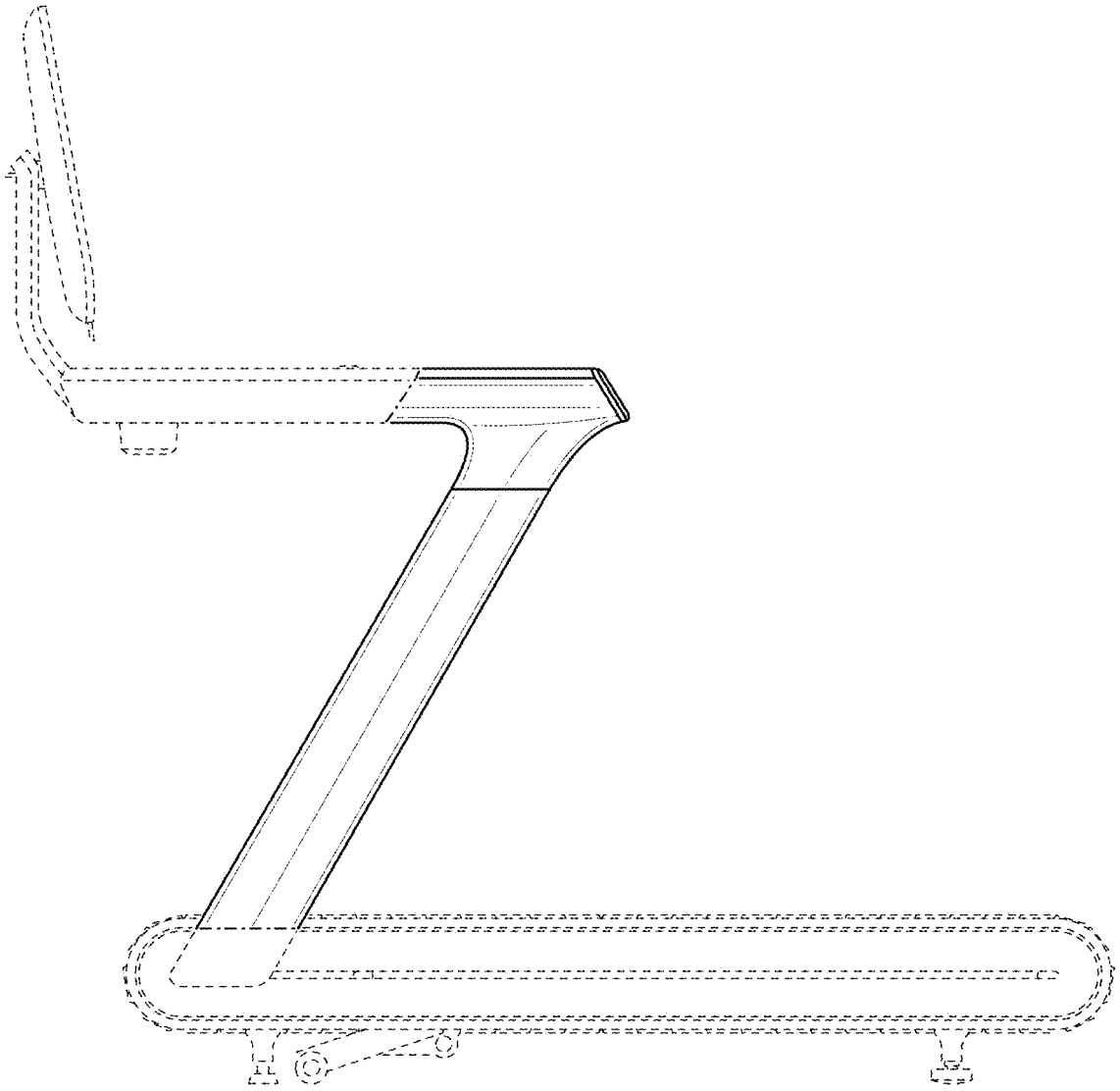
FIG. 5
NEW

Figure 6:
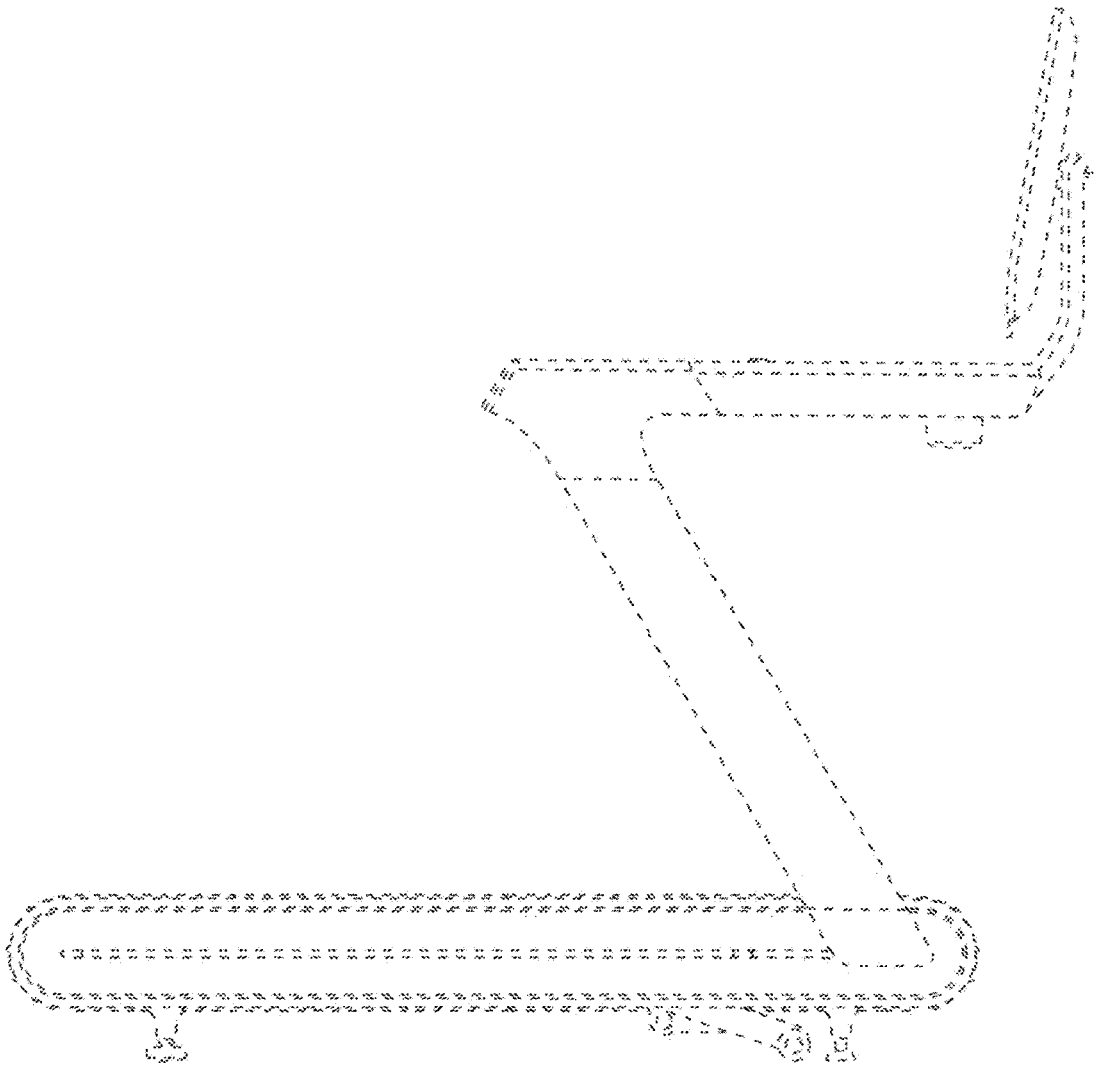

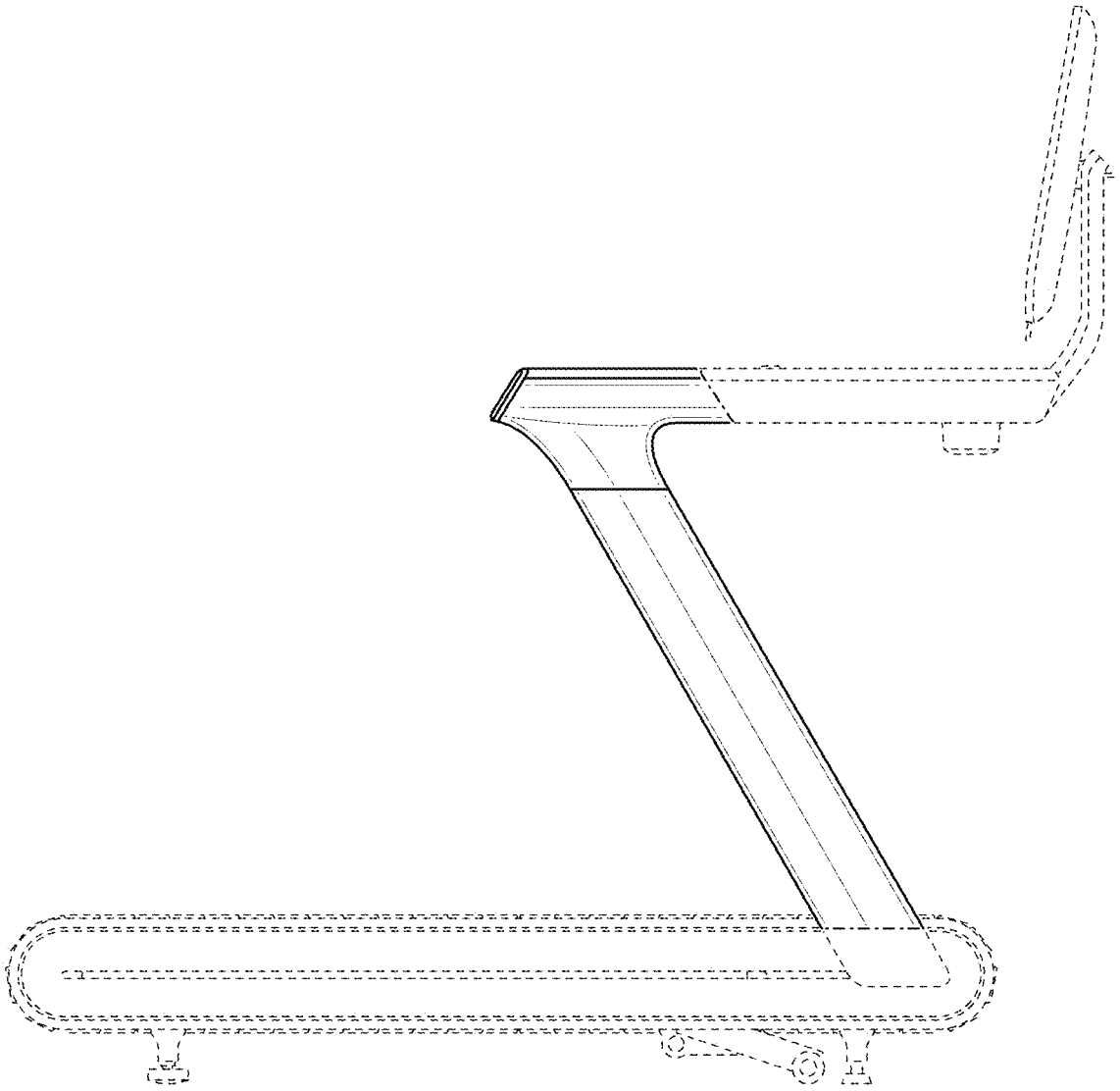
FIG. 6
NEW

Figure 7:
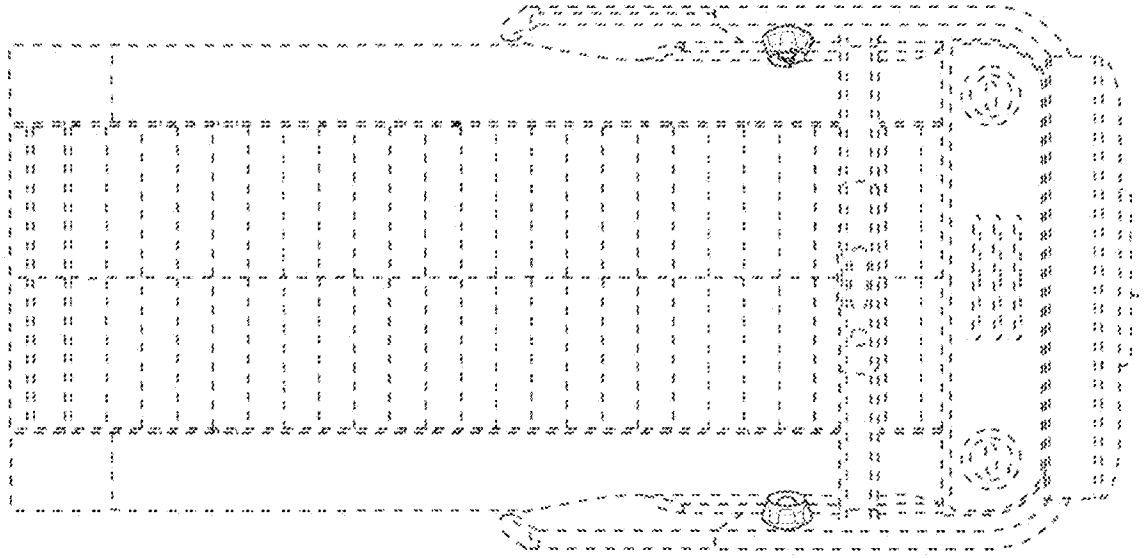

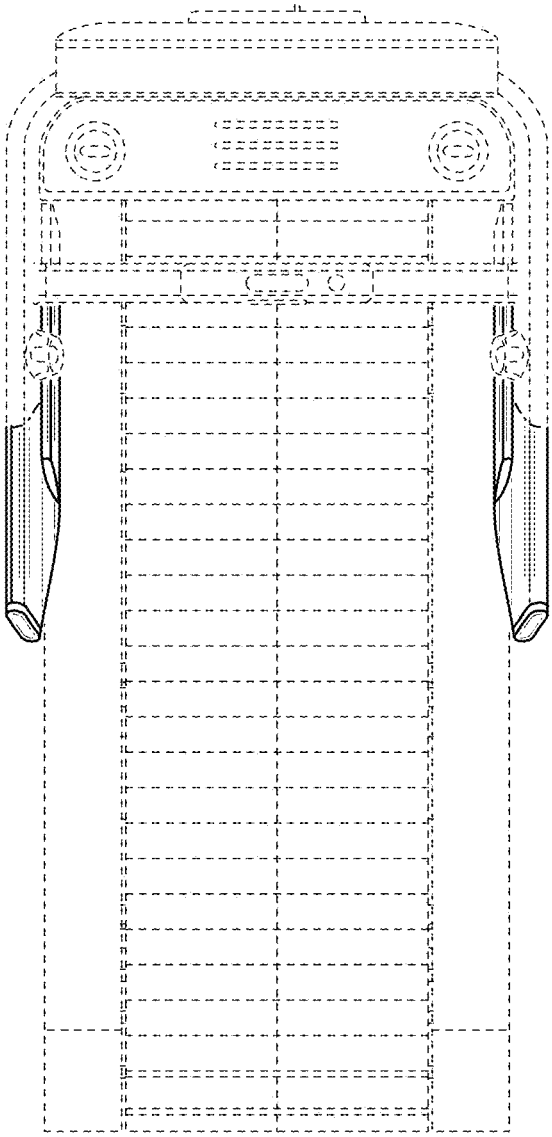
FIG. 7
NEW

Figure 8:
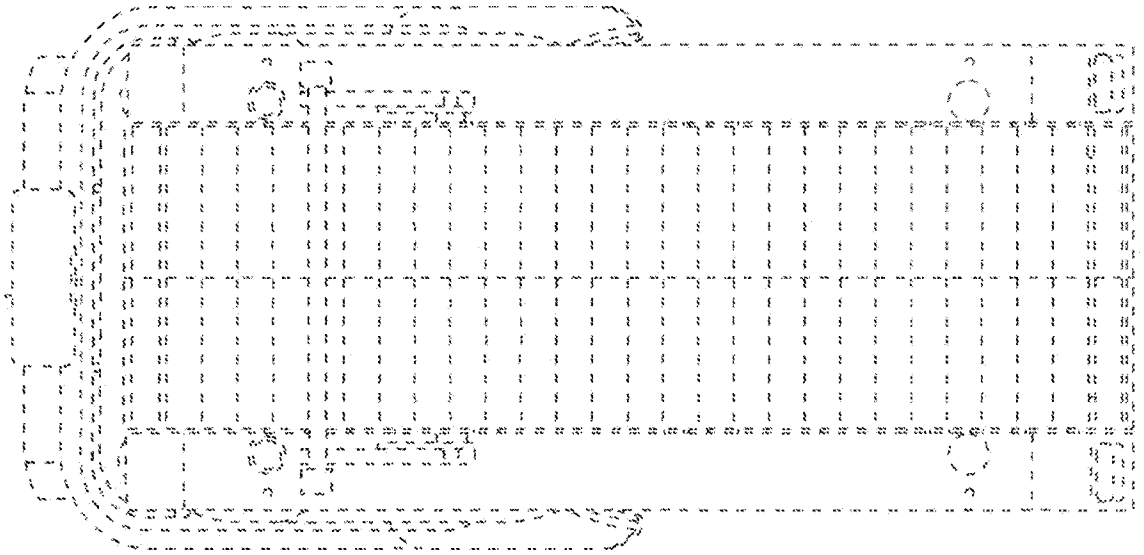
Figure 9:
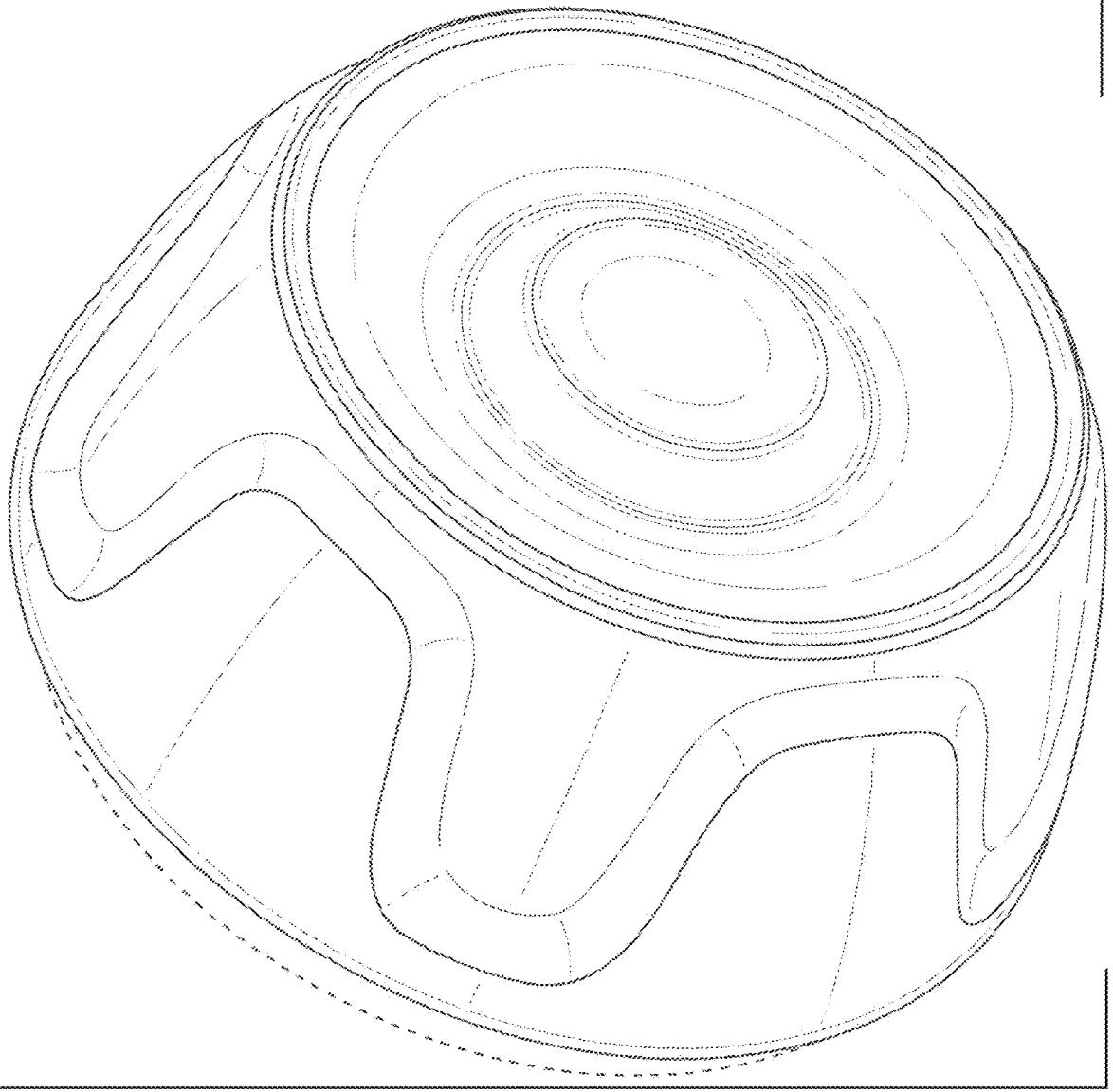
Figure 10:
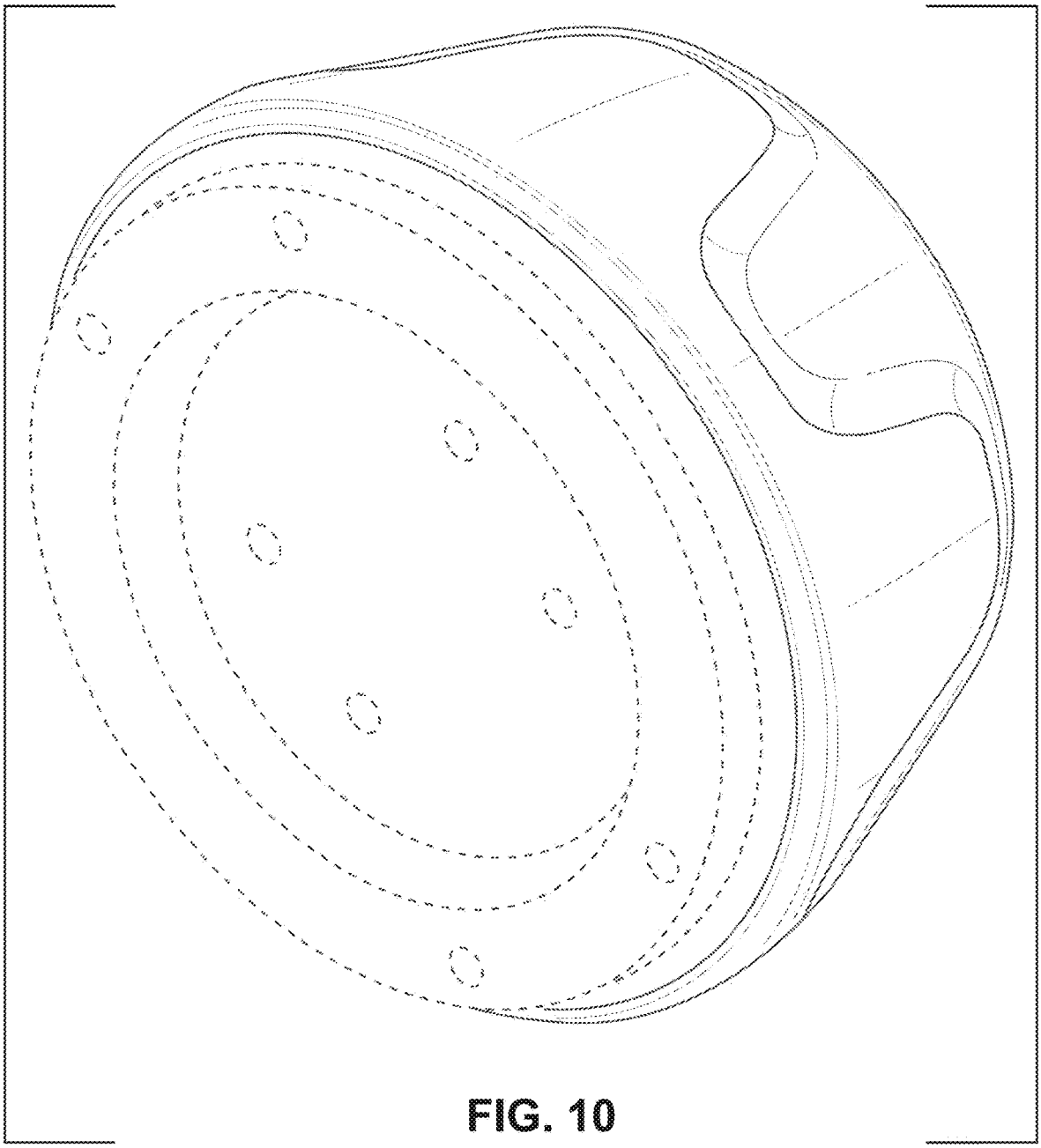
Figure 11:
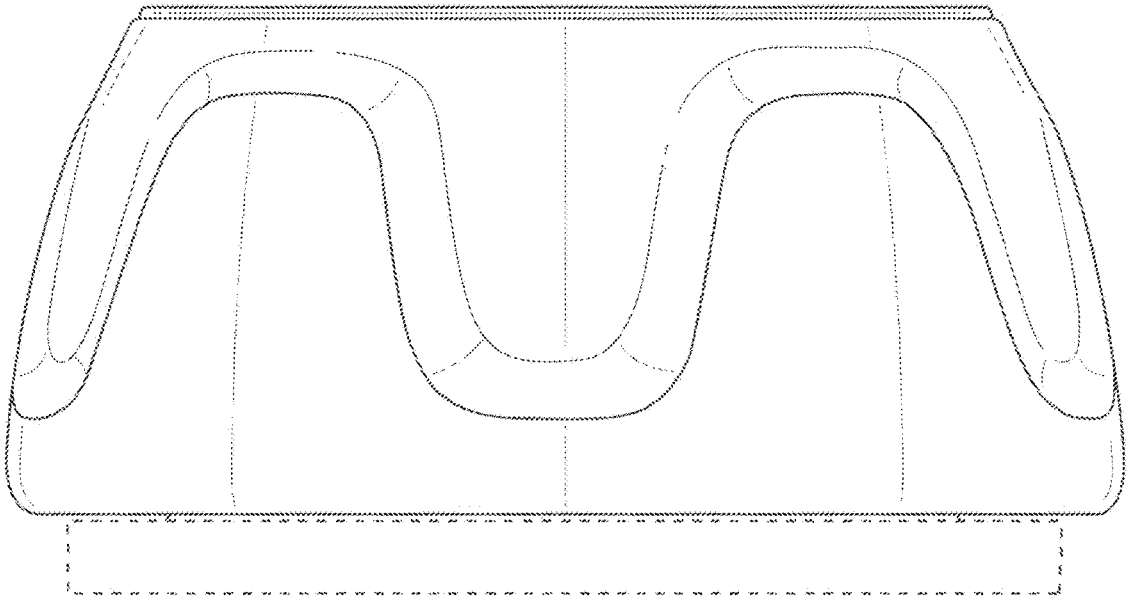
Figure 12:
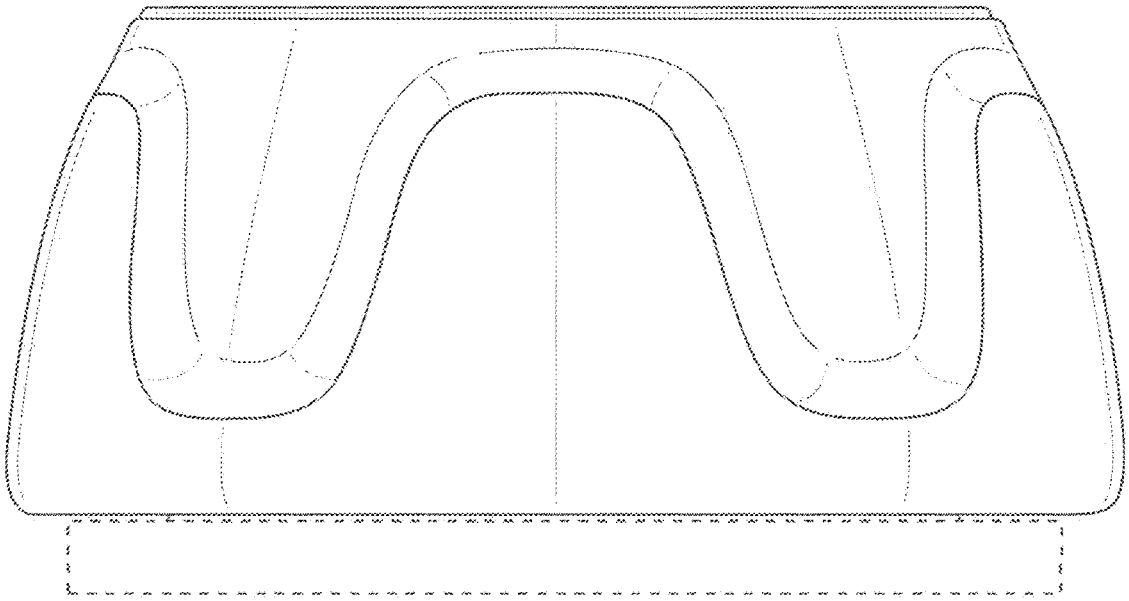
Figure 13:
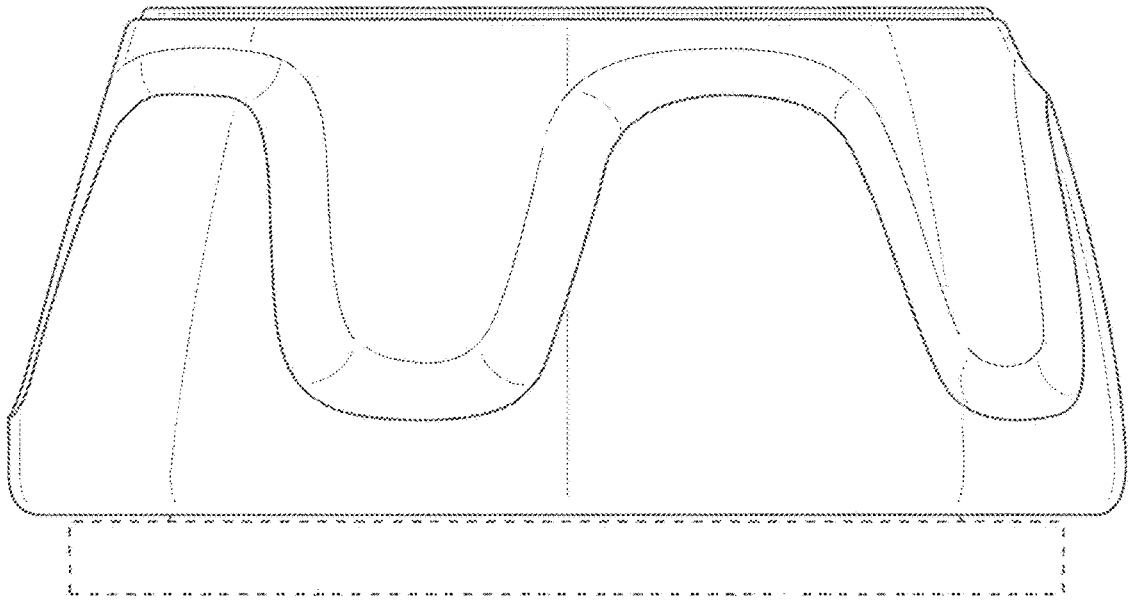
Figure 14:
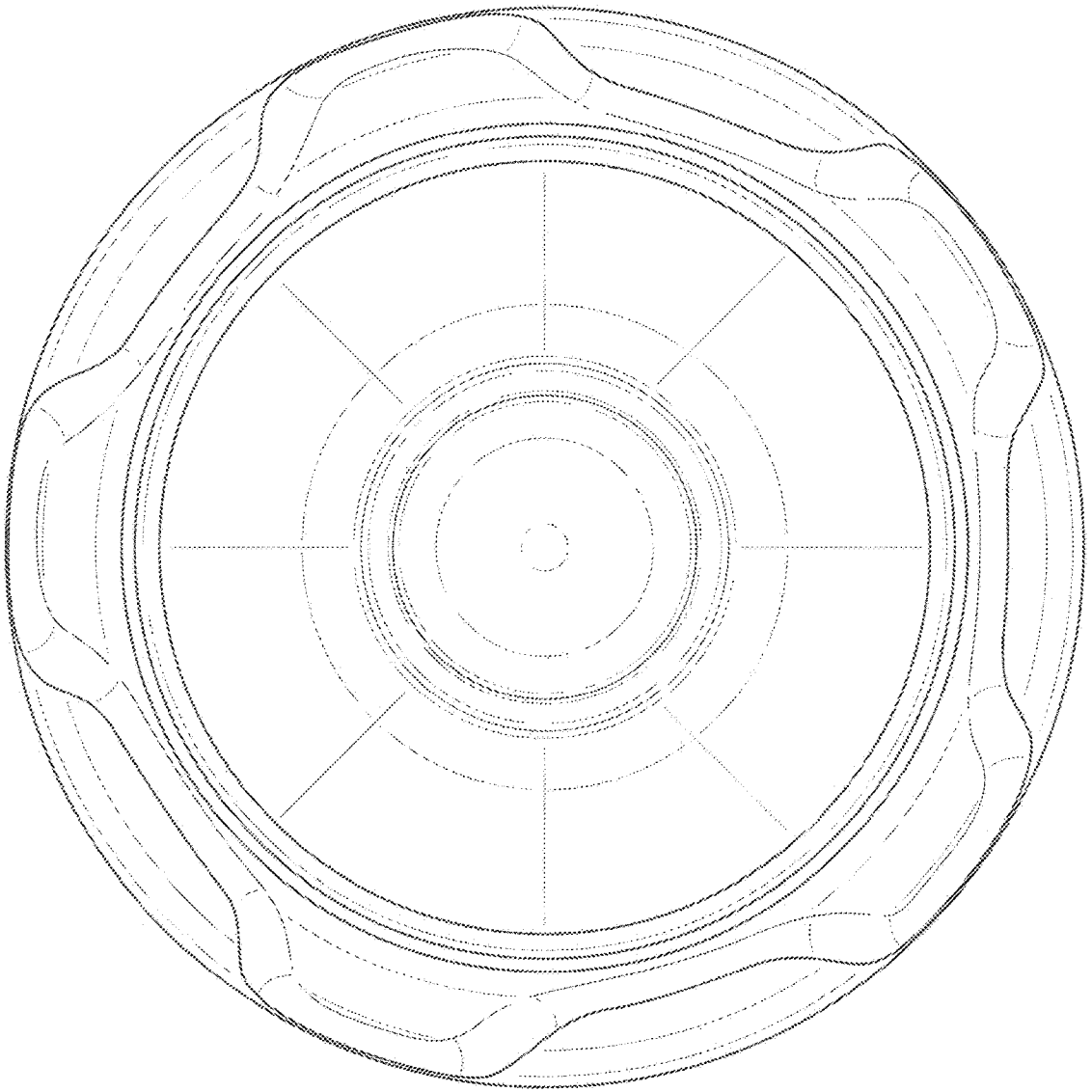

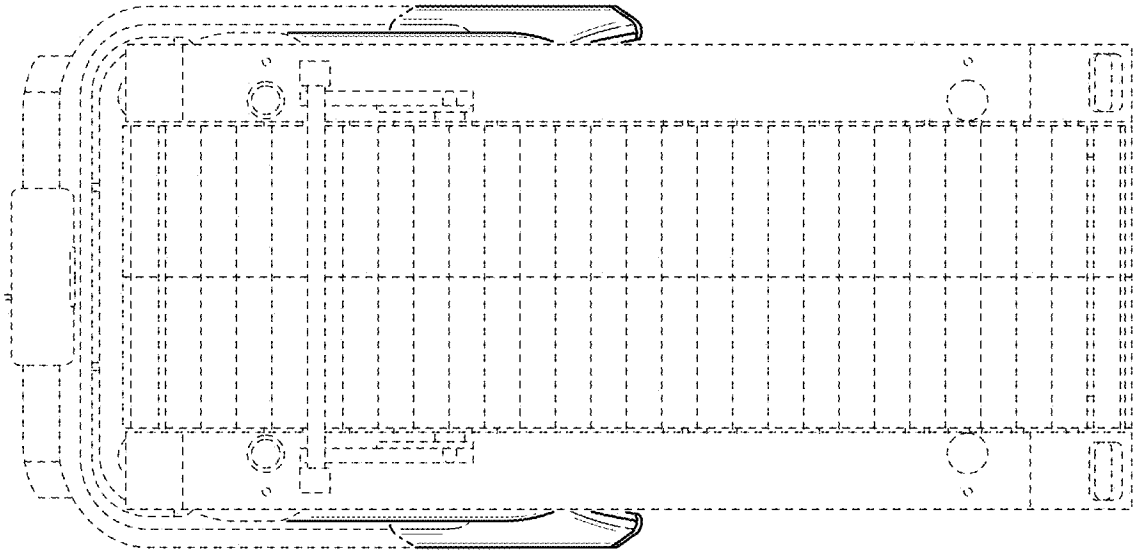
FIG. 8
NEW